United States Patent
Farooq

(10) Patent No.: US 6,973,043 B1
(45) Date of Patent: Dec. 6, 2005

(54) ARRANGEMENT FOR CONVERTING BETWEEN A MEDIA INDEPENDENT INTERFACE AND A TWISTED PAIR MEDIUM USING A FIELD PROGRAMMABLE GATE ARRAY

(75) Inventor: Rizwan M. Farooq, Santa Clara, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1043 days.

(21) Appl. No.: 09/691,913

(22) Filed: Oct. 20, 2000

(51) Int. Cl.[7] ............ H04J 3/14; G06F 11/00
(52) U.S. Cl. ............ 370/250; 370/463; 370/465; 375/213; 375/225; 714/43
(58) Field of Search ............ 370/241, 250, 370/463, 465, 469; 375/211, 213, 216, 224, 225; 714/25, 27, 28, 43, 712

(56) References Cited

U.S. PATENT DOCUMENTS

| | | | | |
|---|---|---|---|---|
| 5,657,317 A | * | 8/1997 | Mahany et al. | 370/338 |
| 5,946,301 A | * | 8/1999 | Swanson et al. | 370/252 |
| 5,953,335 A | | 9/1999 | Erimli et al. | |
| 6,275,498 B1 | * | 8/2001 | Bisceglia et al. | 370/438 |
| 6,430,695 B1 | * | 8/2002 | Bray et al. | 713/501 |
| 6,483,849 B1 | * | 11/2002 | Bray et al. | 370/465 |
| 6,529,961 B1 | * | 3/2003 | Bray | 709/250 |
| 6,542,512 B1 | * | 4/2003 | Fischer et al. | 370/412 |
| 6,556,589 B2 | * | 4/2003 | McRobert et al. | 370/501 |
| 6,842,481 B1 | * | 1/2005 | Lo | 375/211 |
| 2002/0146043 A1 | * | 10/2002 | McRobert et al. | 370/537 |

OTHER PUBLICATIONS

Am79C873, "NetPHY ™–1 10/100 Mbps Ethernet Physical Payer Single–Chip Transceiver with 100BASE–FX Support", AMD Pub. #22164, Rev. A//+2, Feb. 1999.

* cited by examiner

Primary Examiner—Alpus H. Hsu
(74) Attorney, Agent, or Firm—Manelli Denison & Selter PLLC; Leon R. Turkevich

(57) ABSTRACT

An integrated network test device has network logic configured for performing prescribed network device operations and outputting network data based on a media independent interface (MII) based protocol, first test logic configured for performing prescribed test operations on the network data and outputting test data based on the MII-based protocol, and second test logic configured for converting the test data, output from the first test logic according to the MII-based protocol, into analog-based signals for transmission on twisted pair media. The integration of the network logic, the first test logic, and the second test logic dramatically simplifies testing systems, since the integrated network test device can be coupled to test equipment such as a traffic generator, using a relatively simple twisted pair or 10 BaseT connection, as opposed to more complex MII cabling.

12 Claims, 2 Drawing Sheets

ARRANGEMENT FOR CONVERTING BETWEEN A MEDIA INDEPENDENT INTERFACE AND A TWISTED PAIR MEDIUM USING A FIELD PROGRAMMABLE GATE ARRAY

BACKGROUND OF THE INVENTION

1. Field of the Invention

The present invention relates to testing of integrated network devices such as integrated network switches configured for switching data packets between subnetworks, and the conversion of network data between a media independent interface and a prescribed medium such as 10 Base-T twisted pair.

2. Background Art

Local area networks use a network cable or other media to link stations on the network. Each local area network architecture uses a media access control (MAC) enabling network interface devices at each network node to access the network medium.

Switched local area networks such as Ethernet (IEEE 802.3) based systems are encountering increasing demands for higher speed connectivity, more flexible switching performance, and the ability to accommodate more complex network architectures. Hence, network switch designers and test engineers need to be able to minimize the time and expense needed to evaluate designs during prototyping of Ethernet-based network systems.

One problem associated with prototyping network-based switch chips involves the relatively complex interconnections between test system components that affect test system reliability. For example, FIG. 1 is a diagram illustrating a conventional test setup 10, including emulation hardware 12 simulating network traffic, a target device under test 14, for example an integrated multiport switch as illustrated in commonly-assigned U.S. Pat. No. 5,953,335, test logic 16, and a test instrument 18. The test logic 16, implemented for example as a field programmable gate array, is configured for performing prescribed logic functions based on reception of network signals from the target device under test 14 across a first media independent interface (MII) 20a, and outputting modified network signals to the test instrument 18 across a second media independent interface 20b. For example, the test logic 16 may be configured for buffering between the first MII 20a operating at 250 kbps, and the second MII operating at 10 Mbps. Hence, the test logic 16 provides compatability between the target device 14, operating under sub-network speeds during testing, and the test instrument 18 configured for operating at prescribed network data rates.

Use of the media independent interfaces 20 for transfer of data requires use of MII cables, resulting in a relatively complex test configuration that affect test efficiency and reliability. Unfortunately, commercially available physical layer transceivers operate under a fixed clock speed; hence, the relative inflexibility of commercially available physical layer transceivers render then unsuitable for use in the above-described test system 10 in an effort to reduce test system complexity by replacing the media independent interface 20b with a less complex interface.

SUMMARY OF THE INVENTION

There is a need for an arrangement that enables a prototype network system to be developed and tested without the necessity of complex network-based interfaces, such as media independent interfaces.

There also is a need for an arrangement that enables a prototype network system to be developed using conventional twisted pair media, without the necessity of physical layer transceivers having fixed clock speeds.

These and other needs are attained by the present invention, where an integrated network test device has network logic configured for performing prescribed network device operations and outputting network data based on a media independent interface (MII) based protocol, first test logic configured for performing prescribed test operations on the network data and outputting test data based on the MII-based protocol, and second test logic configured for converting the test data, output from the first test logic according to the MII-based protocol, into analog-based signals for transmission on twisted pair media. The integration of the network logic, the first test logic, and the second test logic dramatically simplifies testing systems, since the integrated network test device can be coupled to test equipment such as a traffic generator, using a relatively simple twisted pair or 10 BaseT connection, as opposed to more complex MII cabling.

One aspect of the present invention provides a method in an integrated test device. The method includes performing, using network logic on the integrated test device, first network device operations on received data and outputting network data according to a media independent interface (MII) based protocol. The method also includes performing prescribed test operations on the network data using first test logic on the integrated test device and outputting test data based on the MII-based protocol. The method also includes converting the test data into analog-based signals for transmission on a prescribed network medium using second test logic on the integrated test device.

Another aspect of the present invention provides an integrated network test device. The integrated network test device includes network logic configured for performing prescribed network device operations and outputting network data based on a media independent interface (MII) based protocol. The integrated network test device also includes first test logic configured for performing prescribed test operations on the network data and outputting test data based on the MII-based protocol, and second test logic configured for converting the test data, output from the first test logic according to the MII-based protocol, into analog-based signals for transmission on a prescribed network medium.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
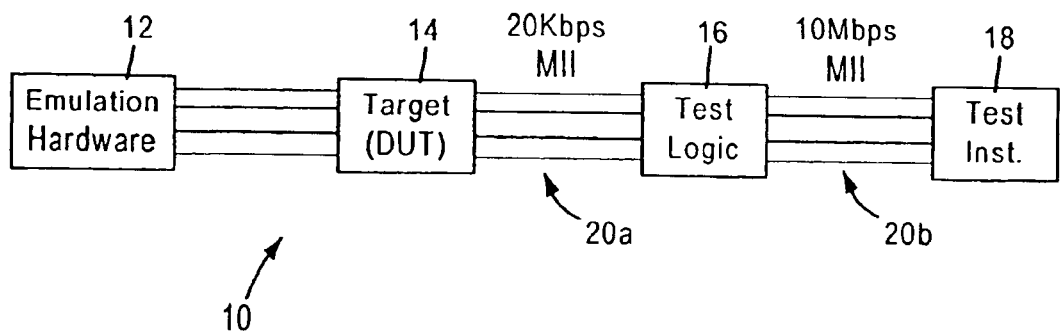
FIG. 1 is a block diagram of a conventional system configured for testing a prototype network design using a target device under test.
Figure 2:
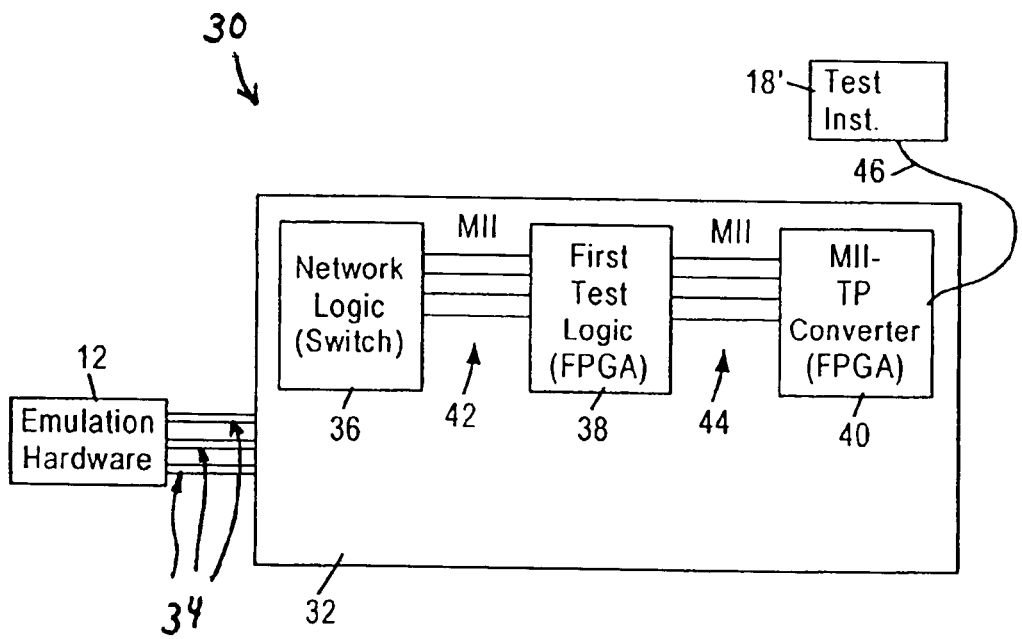
FIG. 2 is a diagram illustrating a system for testing a prototype network using an integrated network test device according to an embodiment of the present invention.

FIG. 2 is a block diagram illustrating a testing system 30 configured for testing an integrated (i.e., single chip) network test device 32. The integrated network test device 32 is configured for receiving data, such as simulated network data, from the emulation hardware 12 across multiple data paths 34. For example, each link 34 may represent an MII-based link for transfer of network data from a simulated link partner.

The integrated network test device 32 includes network logic 36, first test logic 38 implemented using a field programmable gate array, and second test logic 40 implemented using a field programmable gate array. The network logic 36 is configured for performing prescribed network device operations, for example performing switching operations to simulate the network switch 14 as described in the above-identified U.S. Pat. No. 5,953,335. In particular, the network logic 36 includes all or at least part of the components of the simulated network switch necessary to test the logic and operational performance of the network switch prior to commercial production.

At least one network switch port of the network logic 36 is configured for sending and receiving network data across a low speed MII interface 42, for example according to a 250 kilohertz clock. The first test logic 38 is configured for performing prescribed test operations that may be programmed into the field programmable gate array, for example checking valid checksum, etc. Alternatively, the first test logic 38 may merely be configured for converting the network data received according to the 250 kilohertz clock into an IEEE 802.3 compliant data stream, for example into test data output onto a media independent interface 44 using a 10 MHz clock, resulting in a data rate of 10 Mbps or 100 Mbps, as needed.

As described above, commercially available physical layer transceivers have a fixed clock speed, hence they cannot accommodate variations in the data rate on the MII 44 which may be necessary during testing or evaluation of the network logic 36.

According to the disclosed embodiment, use of an integrated network test device 32 enables features to be selectively added or subtracted from the integrated network test device as necessary for optimum testing conditions. In particular, the integrated network test device 32 includes second test logic 40, implemented using a field programmable gate array, for converting the test data output onto the MII interface 44 from the first test logic 38 into analog-based signals for transmission on twisted pair media 46 to the test instrument 18'. Hence, the system 30 can be established without the necessity of MII cables between the target device under test (illustrated as the network logic 36) and the test instrument 18', for example the traffic generator.

Figure 3:
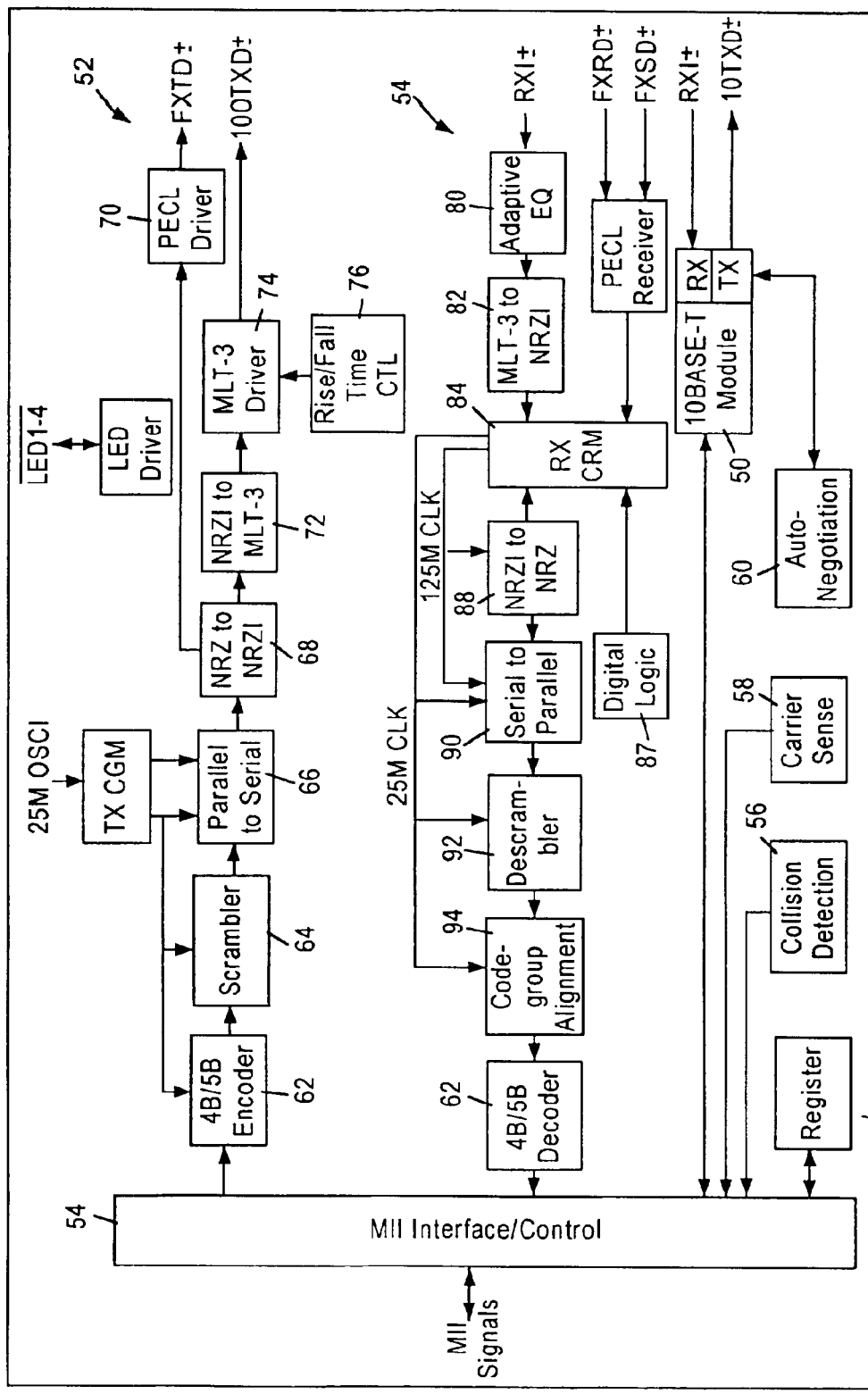
FIG. 3 is a diagram illustrating in detail the interface conversion logic of FIG. 2.

FIG. 3 is a block diagram illustrating the second test logic 40, also referred to as an MII to twisted pair converter, according to an embodiment of the present invention. In particular, the second test logic 40 implements into a field programmable gate array the logic from the commercially-available Am79C873 NeLPHY™-1 10/100 Mbps Ethernet Physical Layer Single-Chip Transceiver with 100BASE-FX Support from Advanced Micro Devices, Inc., Sunnyvale Calif.

The MII to twisted pair converter 40 includes a 10Base-T transceiver portion 50, a 100 Base transmitter portion 52, a 100 Base receiver portion 54, and MII interface control portion 54, and modules for collision detection 56, carrier sense 58, and autonegotiation 60.

The 100 base transmitter portion 52 includes an encoder 62 configured for converting 4-bit (4 B) nibble data generated by the MAC reconciliation layer into a 5-bit (5 B) coded group for transmission. The scrambler 64 scrambles the data stream with sufficient randomization to decrease radiated emissions by spreading the transmit energy across the frequency spectrum. The parallel to serial converter 66 serializes the 5-bit scrambled data into a serial data stream, and the converter 68 performs Non-Return to Zero Interface (NRZI) encoding for compatibility with the TP-PMD standard for 100 Base-TX transmission over Category-5 unshielded twisted pair cable, such as the twisted pair cable 46. If desired, a pseudo ECL (PECL) driver 70 is configured for converting the NRZI coded data into PECL single levels for transmission over fiber media.

The 100 Base transmitter portion 52 also includes an MLT-3 (multiple layer transition) converter 72 for converting the NRZI and coded data stream into two binary data streams with alternately phased logic one events. The two binary data streams are output to the twisted pair output driver 74 which converts the data streams to analog current sources based on a rise/fall-time controller 76.

The 100 Base receiver 54 includes an adaptive equalizer 80 configured for compensating for attenuation in received analog data signals from a copper twisted pair cable 46. The compensated analog data signals in MLT-3 format are decoded into NRZI signals by the decoder 82, which outputs the NRZI signals to the clock recovery module 84. The receiver 54 also includes a PECL receiver 86 configured for receiving PECL signal level data from an optical medium, and outputting the received signals to the clock recovery module 84. Note that the clock recovery module 84 maybe controlled by digital logic 87.

The decoder 88 recovers the NRZ data stream from the NRZI signals output by the decoder 82, and the serial NRZ data stream is converted into 5 bit data by the serial to parallel converter 90. The descrambler 92 descrambles the received data stream, and the code group alignment module 94 converts the unaligned 5-bit data into 5-bit code group data. The decoder 62 than converts the 5-bit code groups into 4-bit nibble data for transfer by the MII interface controller to the MII 44.

Additional details regarding the operation of the MII to the twisted pair converter 40 of FIG. 3 are described in the data sheet (Preliminary) for the above-identified Am79C873 transceiver from Advanced Micro Devices (Publication No. 22164, Issued February, 1999).

According to the disclosed embodiment, an integrated network test device enables network logic to be tested using prescribed network media for interconnection with test instruments, without the necessity of commercially available physical layer transceivers that may have insufficient flexibility to accommodate variations during testing of the network logic. Hence, testing systems maybe developed without the necessity of MII cables between a target device under test and the test equipment, reducing the complexity of the test system. In addition, modules can selectively be added or deleted from the field programmable gate array in the converter 40; hence, a simple twister pair converter may be implemented merely by maintaining the 10Base-T module 50 within the logic 40.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated test device, the method comprising:

performing, using network logic on the integrated test device, first network device operations on received data and outputting network data from the network logic according to a media independent interface (MII) based protocol;

performing prescribed test operations on the network data using first test logic on the integrated test device and outputting test data from the first test logic based on the MII-based protocol; and converting the test data into analog-based signals for transmission on a prescribed network medium using second test logic on the integrated test device.

2. The method of claim 1, wherein the step of performing first network device operations includes switching the received data according to prescribed switching logic.

3. The method of claim 2, wherein the step of performing prescribed test operations includes second converting the network data, having a first data rate, into the test data having a second data rate substantially greater than the first data rate.

4. The method of claim 3, wherein the first data rate is about 250 kbps and the second data rate is about 10 Mbps.

5. The method of claim 1, wherein the converting step includes converting the test data into 10 Base-T compliant analog signals.

6. The method of claim 1, wherein the converting step includes converting the test data into 100 Base compliant analog signals.

7. The method of claim 1, wherein the first test logic and the second test logic are implemented on the integrated test device as respective field programmable gate arrays.

8. An integrated network test device comprising:

network logic configured for performing prescribed network device operations and outputting network data based on a media independent interface (MII) based protocol;

first test logic configured for performing prescribed test operations on the network data and outputting test data based on the MII-based protocol; and second test logic configured for converting the test data, output from the first test logic according to the MII-based protocol, into analog-based signals for transmission on a prescribed network medium.

9. The device of claim 8, wherein the second test logic is configured for converting the test data into 10 Base-T compliant analog-based signals.

10. The device of claim 8, wherein the second test logic is configured for converting the test data into 100 Base compliant analog-based signals.

11. The device of claim 8, wherein the first test logic is configured for converting the network data, having a first data rate of about 250 kbps, to the test data having a second data rate of about 10 Mbps.

12. The integrated network test device of claim 8, wherein the first test logic and the second test logic are implemented on the integrated network test device as respective field programmable gate arrays.

* * * * *